March 31, 1953 F. PERLIN 2,633,065
BLADE AND COVER BLIND SHUTTER FOR CAMERAS
Filed Dec. 11, 1948 9 Sheets-Sheet 1

Inventor
Fred Perlin

March 31, 1953    F. PERLIN    2,633,065
BLADE AND COVER BLIND SHUTTER FOR CAMERAS
Filed Dec. 11, 1948    9 Sheets-Sheet 2

March 31, 1953 F. PERLIN 2,633,065
BLADE AND COVER BLIND SHUTTER FOR CAMERAS
Filed Dec. 11, 1948 9 Sheets-Sheet 3

Inventor
Fred Perlin

March 31, 1953  F. PERLIN  2,633,065
BLADE AND COVER BLIND SHUTTER FOR CAMERAS
Filed Dec. 11, 1948  9 Sheets-Sheet 4

Inventor
Fred Perlin

March 31, 1953  F. PERLIN  2,633,065
BLADE AND COVER BLIND SHUTTER FOR CAMERAS
Filed Dec. 11, 1948  9 Sheets-Sheet 5

Inventor
Fred Perlin

March 31, 1953          F. PERLIN          2,633,065

BLADE AND COVER BLIND SHUTTER FOR CAMERAS

Filed Dec. 11, 1948          9 Sheets-Sheet 6

Inventor
Fred Perlin

March 31, 1953 F. PERLIN 2,633,065
BLADE AND COVER BLIND SHUTTER FOR CAMERAS
Filed Dec. 11, 1948 9 Sheets-Sheet 9

Inventor
Fred Perlin

Patented Mar. 31, 1953

2,633,065

UNITED STATES PATENT OFFICE 2,633,065

BLADE AND COVER BLIND SHUTTER FOR CAMERAS

Fred Perlin, Edgerton, Wis., assignor to Perlin Development Corporation, New York, N. Y., a corporation of New York Application December 11, 1948, Serial No. 64,773

3 Claims. (Cl. 95—60)

1

This invention relates to cameras and more particularly to miniature cameras, and is a continuation in part of the copending application, Serial No. 788,418, filed November 28, 1947, now Patent No. 2,521,743, issued September 12, 1950.

As in the said copending application the present invention provides a camera which is simple to use and, despite its small size, is capable of taking good clear pictures.

An important object of this invention is to provide a shutter mechanism especially adapted for use in miniature cameras and by which predetermined timing is automatically achieved in a manner precluding deviation from the established timing.

The camera of this invention is characterized by the fact that the film is carried in a small removable cartridge or magazine rotatably received in a socket in the body of the camera. Step-by-step rotation of the cartridge successively presents different areas of the film for exposure, and a spring detent serves to define the successive positions of rotation of the cartridge. If the cartridge is properly indexed after each picture is taken double exposures are avoided. To assure such proper indexing is another object of this invention; and to this end the invention provides a novel interconnection between the shutter actuating means and the spring detent by which the shutter actuating means is rendered inoperative once it has been operated and until the cartridge is indexed to its next "picture taking" position.

More specifically it is an object of this invention to provide a latch operable to hold the shutter tripping trigger down after each exposure and until the film carrying cartridge has been indexed to move the film into position for the next exposure during which operation the latch is disengaged by a pin reacting between the latch and the spring detent which holds the cartridge in its successive indexed positions.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which.

2

Referring now particularly to the accompanying drawings in which like numerals indicate like parts throughout the several views it will be seen that the camera of this invention essentially comprises two main elements, namely, the camera per se indicated generally by the numeral 5 and a film cartridge indicated generally by the numeral 6.

The camera 5 consists of a body member or housing 7 having a socket 8 opening to the rear thereof for the reception of the film cartridge 6, and a cap or cover member 9 secured to the body member 7 by screws 10 or other suitable fastening means. The cap or cover 9 coacts with the front wall 11 of the camera body to house and mount the shutter mechanism indicated generally by the numeral 12. The shutter mechanism is tripped by depression of a trigger 13 which projects from the top of the camera.

Figure 11:
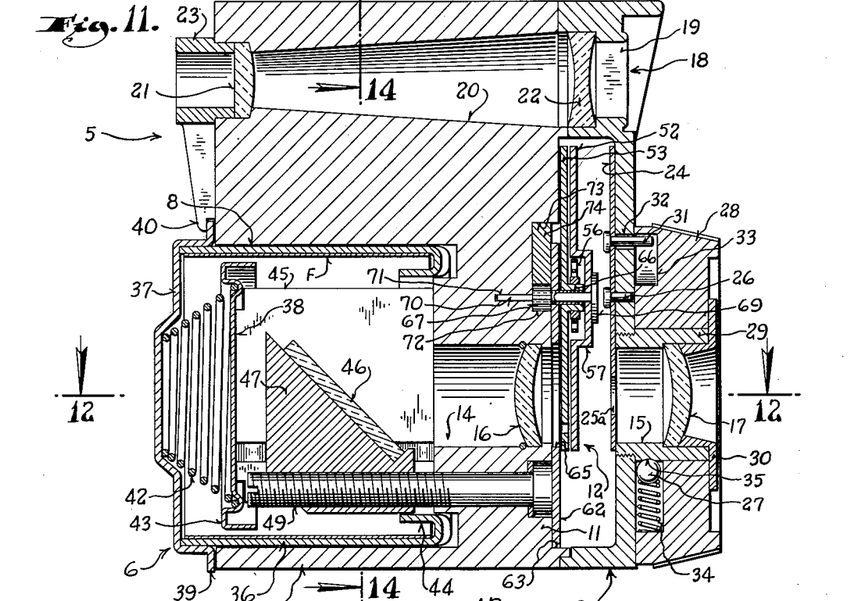
Figure 11 is a longitudinal sectional view through the entire camera taken on the median plane thereof.
Figure 12:
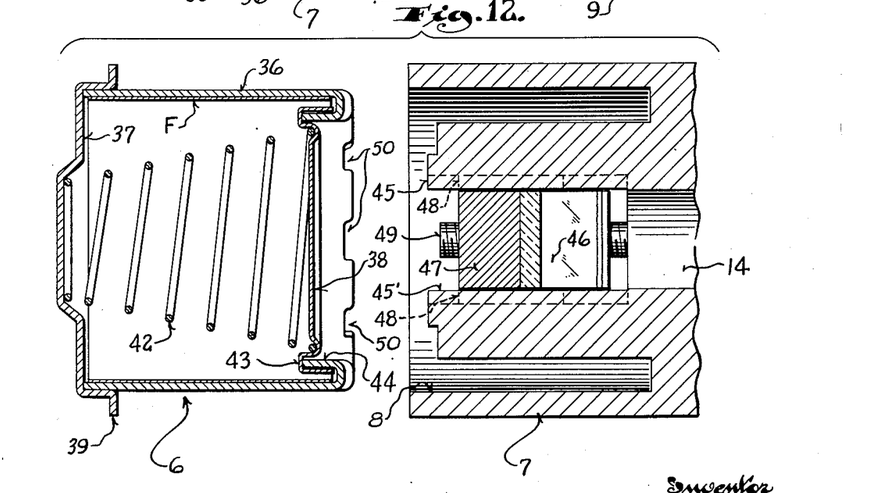
Figure 12 is a longitudinal sectional view through Figure 11 on the plane of the line 12—12 but showing the film cartridge removed.

The front wall 11 of the body 7 has a light entry aperture 14 coaxial with and opening to the socket 8 and the cap or cover 9 has a correspondingly placed aperture 15. Lenses 16 and 17 are mounted in the apertures 14 and 15, respectively. Thus, light is projected into the socket 8 through the aligned apertures 14 and 15, under control of the shutter mechanism which, as clearly shown in Figure 11, is located in the space between the front wall of the camera body and the cap or cover between the apertures 14 and 15.

To enable focusing the camera upon a selected object a finder indicated generally by the numeral 18 is provided. This finder comprises a framing aperture 19 in the cap or cover member 9 in line with a tubular passage 20 extending longitudinally through the body of the camera. Lenses 21 and 22 are mounted at the opposite ends of the passage 20, the lens 21 being held in the body 7 by a ferrule 23 and the lens 22 being secured in a suitable socket in the inner face of the cap or cover 9 directly behind the framing aperture 19.

Though the light entry aperture opening into the socket 8 may be of a fixed size it is preferable that it be adjustable and to this end a circular disc or plate 24 having three different sized holes 25, 25a and 25b is rotatably mounted on the inner face of the cap or cover 9 by a pivot pin 26 driven into the cap or cover. The disc 24 is of a diameter to extend across the light path through apertures 14 and 15 and to permit the passage of light therethrough only when the disc is in a position at which one of its three different sized holes is aligned with the apertures 14 and 15. These three positions are defined by a ball detent 27.

Rotation is imparted to the disc 24 by means of an aperture selector dial 28 rotatably mounted on the front of the cap or cover coaxially with the light entry aperture 15 therein. While any suitable manner of mounting the dial 28 may be employed, in the construction illustrated the dial is journalled on a ferrule 29 which projects from the front of the cap or cover. A flanged bushing 30 secured in the ferrule 29 holds the dial and the lens 17 in place.

Notwithstanding the eccentricity of the dial 28 and the disc 24 these parts are connected for the transmission of torque. The connection consists of a pin 31 fixed to the disc and extending through an arcuate slot 32 in the cap or cover into a radially extending groove 33 in the inner face of the dial. Thus, as the dial is turned the radial elongated groove 33 accommodates the approach of the pin 31 toward the axis about which the dial turns.

Figure 1:
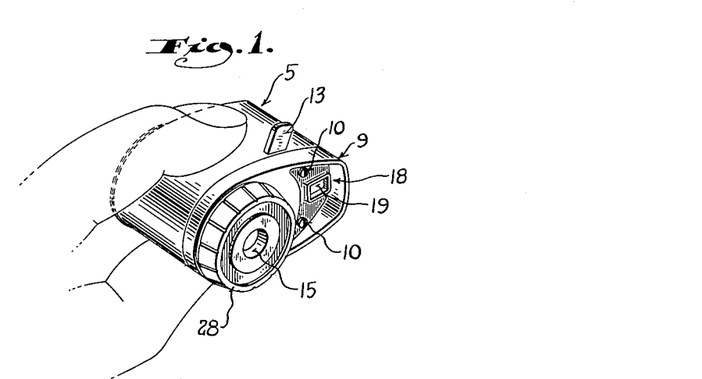
Figure 1 is a perspective view at approximately full scale illustrating the camera of this invention in its position of use.
Figure 2:
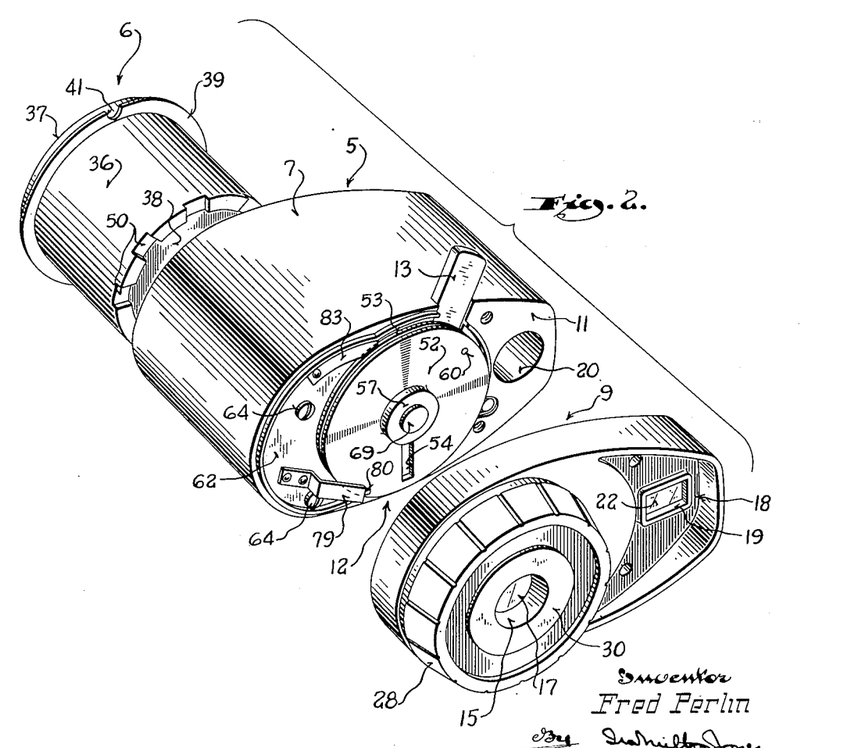
Figure 2 is a perspective view of the camera with its main elements separated and drawn to a scale larger than full size.
Figures 3, 4:
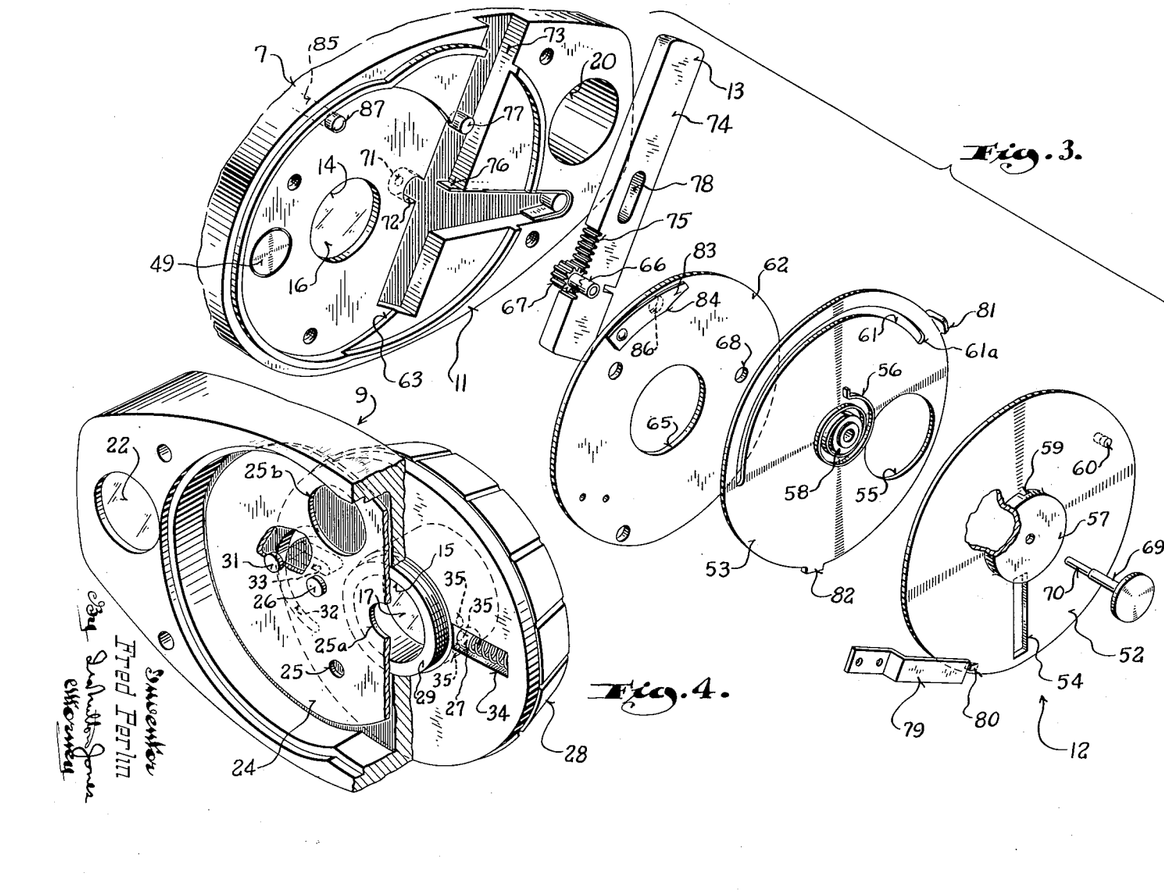
Figure 3 is a perspective view showing the shutter mechanism employed in the camera shown in Figure 1, with the parts thereof separated and in their proper order of assembly.
Figure 4 is a perspective view showing the inside of the front cap or cover of the camera detached from the camera body and with parts thereof broken away and in section to illustrate structural details.

The ball detent 27, which as noted hereinbefore serves to define the positions of adjustment of the disc 24, is mounted in a cavity 34 in the back of the dial as clearly shown in Figures 4 and 11, the ball being spring pressed and engageable in one of three pockets or seats 35 in the side of the ferrule 29.

The film cartridge 6 which, as noted hereinbefore, is readily removably received within the socket 8 of the camera body comprises a cylindrical shell 36 and end walls 37 and 38 for closing the opposite ends of the shell. The shell fits snugly into the socket and the inner cylindrical surface of the shell supports the film or photosensitive element F in position for exposure. A length of ordinary 16 mm. film corresponding to the circumference of the inner surface of the shell or an equivalent length of film specially made for this camera may be used. Removal of the end walls 37 permits insertion of the film which is done by simply curling the film into a cylinder, slipping it into the shell and allowing it to expand into engagement with the inside wall of the shell. This loading of the cartridge, of course, must be done in a dark room, but since the cartridge is of such inexpensive construction, the loaded cartridge might very well be sold for little more than the price of the film.

The end wall 37 which closes the rear end of the cartridge is detachably mounted on the rear end of the shell in any suitable manner as by being telescoped thereover with a press fit. An outturned marginal flange 39 on this removable end wall coacts with a retaining finger 40 on the back of the camera body to removably hold the cartridge in the socket 8, a notch 41 in the flange 39 permitting assembly of the cartridge with the camera body.

Figure 13:
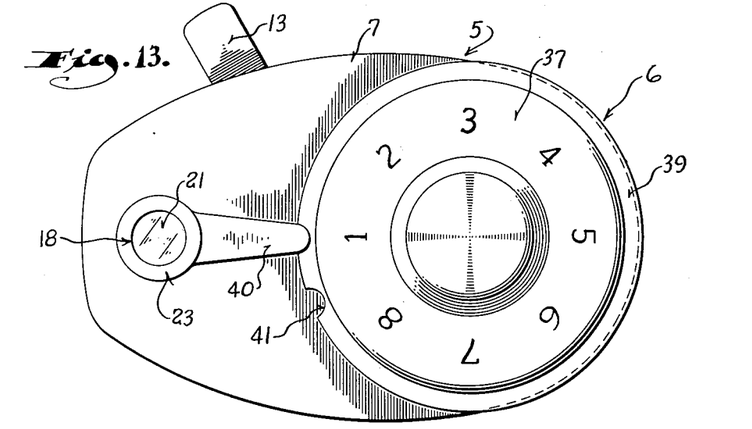
Figure 13 is a rear view of the camera illustrating particularly the manner in which the film cartridge is held assembled with the camera.
Figure 14:
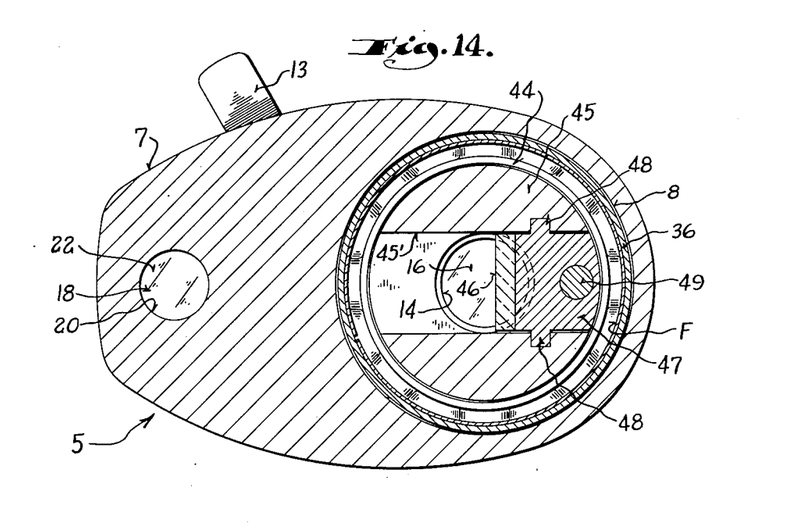
Figure 14 is a cross sectional view through Figure 11 on the plane of the line 14—14.

The retaining finger 40 may be integral with the body of the camera but is conveniently extended from the ferrule 23. As shown in Figure 13, the retaining finger also serves as a pointer to coact with numbers on the end wall 37 of the cartridge to indicate the several positions of rotation of the cartridge in which exposures are to be made. As will be explained hereinafter the taking of each picture exposes only a segment of the film.

The front wall 38 of the film cartridge is depressible into the interior of the cartridge against the force of a conical coil spring 42 confined between the two end walls with its ends nested in suitable seats formed in the end walls. A rim 43 on the periphery of the disc-like end wall 38 interengages with a rim 44 provided by the inturned adjacent end of the shell, to limit outward displacement of the wall 38 and also provide a light trap to effectually exclude light from the interior of the cartridge as long as the depressible disc-like end wall 38 is in its normal position in which it is yieldingly maintained by the spring 42.

It is to be noted that the disc-like end wall 38 is small enough to permit the same to be pushed into the shell without danger of scraping against the face of the film providing, of course, that coaxiality is maintained between the shell and the end wall. During insertion and removal of the cartridge into and from the camera such coaxiality is maintained by the centering or guiding engagement between the depressible wall 38 and a cylindrical projection 45 which extends back into the socket 8 from the front wall 11 thereof. This projection is long enough to push the end wall 38 into the shell far enough to uncover the film F for exposure upon full insertion of the cartridge into the socket as shown.

A longitudinal slot 45' extends diametrically across the projection 45. This slot opens to the aperture 14 and has a light reflecting surface 46 mounted therein. The surface 46 is inclined so as to bend the light rays entering the socket through the aperture 14 and project them onto an arc or segment of the film or photosensitive element. The surface 46 may be simply a mirror adhered to a block 47 or other suitable support set into the slot 45'.

The extent of the film exposed depends upon the width of the slot 45' and in the present embodiment is approximately one-eighth the circumference of the cartridge shell so that one length of film provides for eight pictures.

Preferably though not necessarily the block 47 upon which the reflecting surface 46 is mounted is adjustable along the axis of the light entry aperture to vary the focal length. To this end the block 47 has slides 48 riding in ways in the inner faces of the slot 45', and an adjusting screw 49 freely rotatable but non-longitudinally movably secured in the camera body is threaded into the block 47. Turning the screw slides the block 47 forward and backward as will be readily apparent, access to the screw being had through the open rear end of the socket upon removal of the film cartridge.

The front end of the film cartridge and specifically the inturned front end of its shell is castellated to provide a plurality of circumferentially spaced notches 50. These notches correspond in number to the number of exposures to be made on a length of film (eight in this case) and coact with a spring detent 51 (see Figures 8 and 9) to properly index rotation of the cartridge from one position of exposure to the next. As will appear from inspection of Figures 8 and 9 the detent spring 51 is so constructed that rotation of the cartridge is possible in only one direction, thus precluding double exposure as a result of unintentional retrograde rotation of the film cartridge.

As will be hereinafter more fully described the spring detent 51 also interconnects the cartridge and the shutter trigger so that the trigger is automatically held down after tripping the shutter and until the film cartridge is rotatably indexed to its next position. This interconnection between the shutter mechanism and the cartridge thus precludes double exposure as a result of repeated shutter opening without having first indexed the film cartridge.

*Shutter mechanism of Figs. 3, 5, 6 and 7*

Though the shutter mechanism 12 may take various forms, it is desirable that it be so constructed as to inherently have predetermined timing which remains unaffected by changes in the position of the camera. The shutter mechanism illustrated in Figures 3, 5, 6 and 7 fully meets these objectives.

This shutter mechanism is characterized by the fact that two superimposed round shutter discs 52 and 53 are employed. These discs are rotatably mounted on the front wall 11 of the camera body to one side of the light entry aperture so that the superimposed discs overlie the aperture and thus control light passage therethrough. Both discs have holes therein adapted to be brought into registry with the light entry aperture by rotation of the discs.

The hole in the top disc 52 is in the form of a radial slit 54 while the hole 55 in the bottom disc 53 is round and as large as the aperture 14. Obviously when the two discs are in such positions of rotation that both holes 54 and 55 register with the light entry aperture, light passes into the camera for a length of time depending upon the duration of such registry. While this "timing" involves such considerations as the extent of the required travel of the discs and their mass, it can be set by the tension upon a spiral hair spring 56 which connects the two discs and, as will be hereinafter described, drives the top disc.

The hair spring is conveniently mounted within a hub portion 57 on the top disc 52. The inner end of the hair spring is brazed or otherwise suitably fixed to a hub 58 on the bottom disc 53 while the outer free end of the spring 56 is hooked into a notch 59 in the hub 57 when the parts are assembled.

A pin 60 projecting down from the top disc 52 rides in an arcuate slot 61 in the bottom disc 53 and by engagement with the end 61a of the slot yieldingly limits relative rotation between the two discs in one direction.

The discs are rotatably mounted upon a mounting plate 62 which in turn is adapted to be secured to the front wall 11 of the camera where it rests into a shallow recess 63. Screws 64 removably hold the mounting plate in position with a hole 65 in the plate registering with the aperture 14. The bottom disc 53 is rotatably mounted upon the plate by the hub 66 of a pinion 67 which passes through a hole 68 in the mounting plate and is driven into the hub 58 in the disc, the pinion being at the underside of the mounting plate.

The top disc 52 is rotatably held in position by a large-headed pin 69 which passes through a hole in the disc 52 and is freely received in the bore of the pinion hub 66, with its end portion 70 protruding beyond the pinion 67 and being driven into a hole 71 in the front wall 11 of the camera. A shoulder at the junction of the pin portions 69 and 70 limits the extent to which the pin may be driven into the hole 71 and thus assures against either of the discs binding.

The pinion 67 is received within a pocket 72 in the front wall 11 which communicates with one side of a slideway 73 also formed in the front wall 11. The slideway 73 accommodates a shutter trigger bar 74 having a rack 75 in mesh with the pinion 67. A leaf spring 76 yieldingly maintains the trigger bar in its normal outwardly projected position defined by a stop pin 77 projecting from the wall 11 into a slot 78 in the trigger bar. Thus, depression of the bar 74 acts through the rack and pinion to impart rotation to the bottom disc 53.

Figure 5:
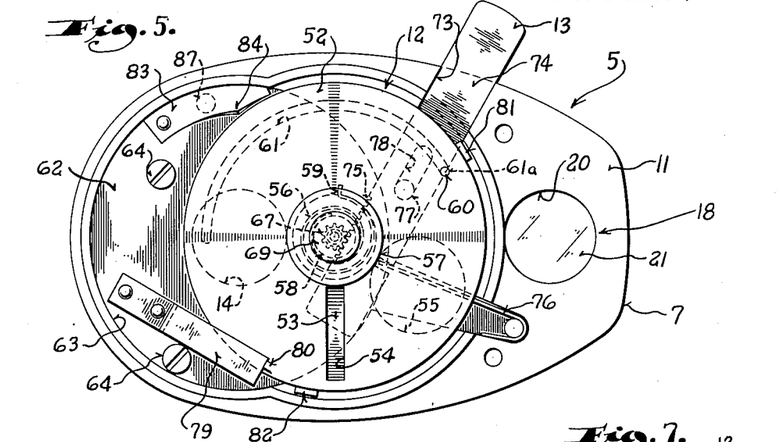
Figure 5 is a front view of the camera with its front cap or cover removed and illustrating the shutter mechanism of Figure 3 with the shutter in its normal closed position.

In the normal free position of the parts shown in Figure 5 the hole 55 and the slot 54 in the bottom and top discs respectively are both out of register with the light entry aperture and with each other. Upon depression of the trigger bar 74 the bottom disc 53 is turned in a clockwise direction (as viewed in Figures 5, 6 and 7) from the position it occupies in Figure 5 toward the positions shown in Figures 6 and 7. While the bottom disc is being so turned a latch 79 engaging a stop 80 on the top disc 52 restrains the latter against following along with the bottom disc, and the resulting relative rotation of the two discs additionally loads the hair spring 56.

Figure 6:
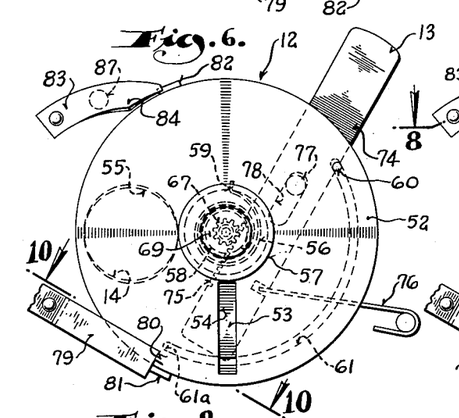
Figure 6 is a view similar to Figure 5 but omitting the illustration of the camera body per se showing the shutter trigger depressed sufficiently to bring one of the elements of the shutter into its position uncovering the light entry aperture but leaving the other element of the shutter in its position closing the aperture.

Toward the end of the depression of the trigger bar 74 as shown in Figure 6, at which time the hole 55 is almost in exact registry with the light entry aperture, a cam 81 projecting up from the periphery of the bottom disc 53 moves under the spring latch 79 to lift the same off the stop 80 and thus free the top disc 52 for rotation by the loaded hair spring 56. The hair spring snaps the top disc 52 around so that its slit 54 sweeps across the hole 55 which at this instant is in register with the aperture 14 thereby permitting light entry for a predetermined instant of time.

The spring propelled rotation of the disc 52 continues until its pin 60 reengages the end 61a of the arcuate slot 61 in the bottom disc 53, and then the parts are restored to their normal position, shown in Figure 5, by the leaf spring 76 which, of course, acts through the rack and pinion 75—67.

However, because of the interlock hereinbefore mentioned between the film cartridge and the shutter tripping mechanism the shutter parts are restrained against restoration to their normal positions until the cartridge has been indexed into its next exposure position. The structure by which this interlock is effected comprises a stop lug 82 extending radially from the periphery of the bottom disc 53 and engageable under and behind a spring latch 83 during the final rotation of the bottom disc by depression of the trigger bar.

Figure 7:
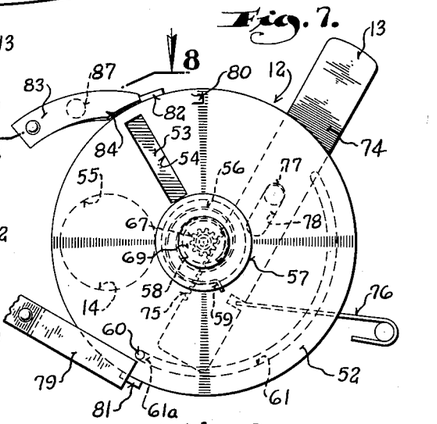
Figure 7 is a view similar to Figure 6 but showing the parts in the positions they occupy the very next instant as a result of the final small travel of the shutter trigger.
Figure 8:
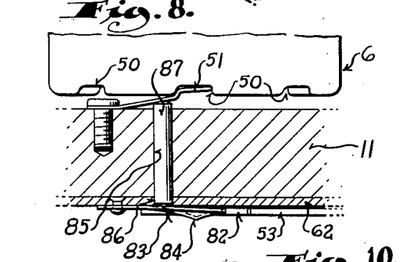
Figures 8 and 9 are detail sectional views taken on the plane of the line 8—8 in Figure 7 and illustrating the manner in which a spring detent or latch mechanism coacts with the film cartridge to preclude double exposure by holding the shutter trigger in its depressed position until the film cartridge has been indexed to its next position.
Figure 9:
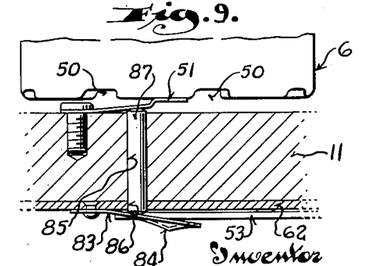
Figure 10:
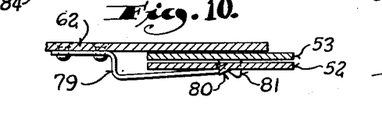
Figure 10 is a detail sectional view through Figure 6 on the plane of the line 10—10.

As best shown in Figures 8 and 9 the spring latch 83 which is riveted to the mounting plate 62 has its inner edge portion flared outwardly as at 84 to allow the stop lug 82 to pass thereunder but the free end of the latch is so positioned as to engage the trailing end of the lug 82 as the same rides under the latch to its position shown in Figure 7.

It is to be noted that the latch 83 overlies registering holes 85 and 86 in the front wall 11 and the mounting plate 62, respectively. The holes 85 and 86 are in line with the spring detent 51 which engages the castellated inner end of the film cartridge so that a pin 87 slidable in the holes 85 and 86 interconnects the detent 51 and the latch 83. Thus, upon deflection of the detent 51 effected by rotary indexing of the film cartridge, the pin 87 is moved outwardly a slight distance to lift the spring latch 83 and release the shutter parts for restoration to their normal free positions.

It is, of course, understood that during restoration of the shutter mechanism the engagement of the end 61a of the arcuate slot 61 with the pin 60 carries the top disc 52 back to its normal position to reengage the stop 80 with the spring latch 79. It will also be readily apparent that since the release of the shutter mechanism for restoration to its normal picture-taking condition depends upon the indexing of the film cartridge to bring the film into position for the next exposure, double exposure as a result of repeated actuation of the shutter mechanism without having first indexed the film is precluded.

The latch 79 like the latch 83 is riveted to the mounting plate 62 and, as will be recognized by those skilled in this art, the mounting of the entire shutter mechanism upon the plate 62 provides a sub-assembly which enables adjustment and testing of the shutter before it is assembled with the camera.

*The shutter mechanism of Figs. 15–18*

The shutter mechanism illustrated in Figures 15 to 18, inclusive, is similar to that described to the extent that it utilizes a hair spring and at least one rotary shutter disc 88, the trigger bar 89 taking the place of the bottom disc. The trigger bar 89 has a hole 90 adapted to be brought into register with the light entry aperture 14 by manual depression of the bar, and the disc 88 has a hole 91 adapted to sweep across the light entry aperture.

A hair spring 92 having its inner end fixed to the hub of the disc 88 and its outer end anchored as at 93 normally yieldingly holds the disc in a position at which its hole 91 is out of register with the light entry aperture. Upon depression of the the trigger bar 89 against the tension of its return spring 94 a driving lug 95 on the side of the bar collides with a pin 96 eccentrically fixed to the disc 88 to impart counterclockwise rotation to the disc and wind up the hair spring 92.

Figure 15:
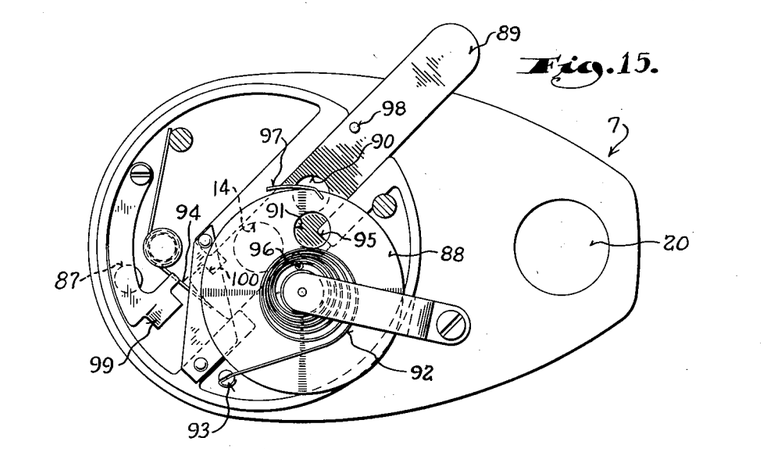
Figure 15 is a front view of the camera body with its cap or cover removed and illustrating a modified form of shutter which is distinguished from that illustrated in the views already described principally in that it has but a single rotating disc whereas the shutter mechanism of the previously described views uses two superimposed discs.
Figures 16, 17:
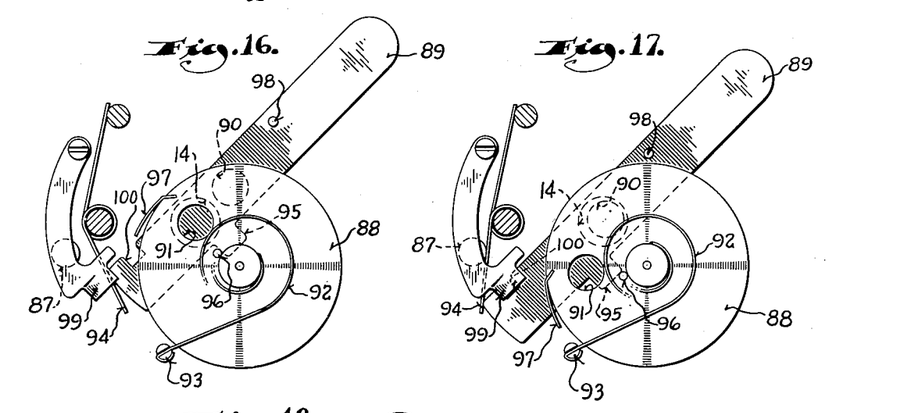
Figures 16, 17 and 18 are views similar to Figure 15 but showing only the shutter mechanism and illustrating the same in its different positions during actuation thereof.

As will be seen from a comparison of Figures 15, 16 and 17 during this action the hole 91 in the disc leads the hole 90 in the trigger bar to be carried past the light entry aperture 14 before the hole 90 is brought into register therewith.

As the depression of the trigger bar continues and its hole 90 is brought into register with the light entry aperture the driving lug 95 moves along to a point at which the pin 96 clears the same which happens the instant after the position of the parts depicted in Figure 17. With the release of the disc 88 in this manner the hair spring 92 swings the disc around at a speed dependent upon the tension of the spring to sweep the hole 91 across the light entry aperture and admit light into the camera for a predetermined time interval.

Figure 18:
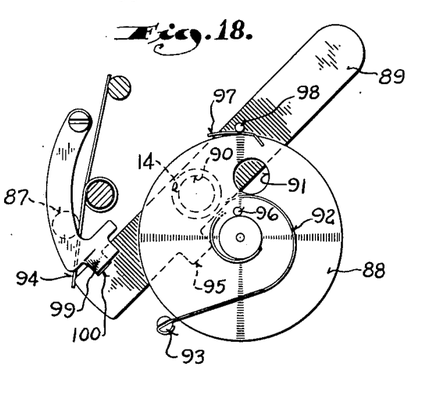
Figure 19:
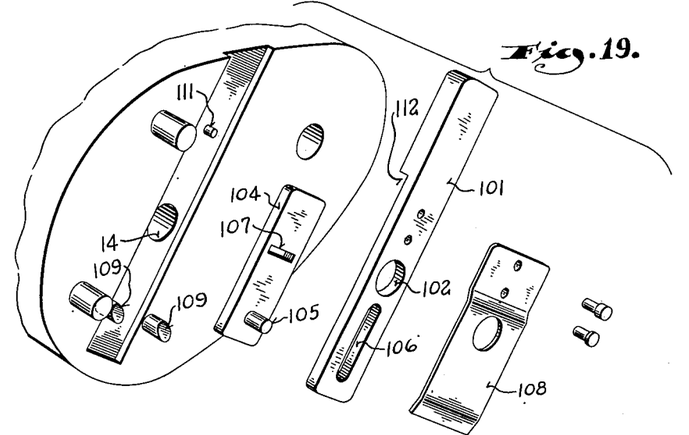
Figure 19 is a perspective view illustrating the main elements of still another type of shutter mechanism which may be used in this camera and showing the various parts thereof separated and in their proper order of assembly.
Figure 20:
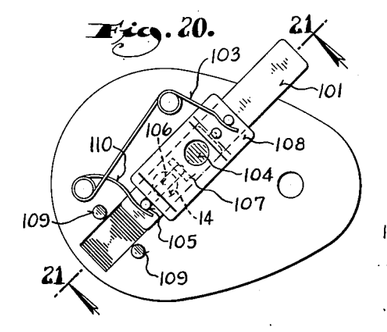
Figure 20 is a front plan view of the shutter mechanism shown in Figure 19 with the shutter in its normal position.
Figure 21:
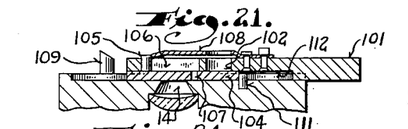
Figure 21 is a detail sectional view through Figure 20 on the plane of the line 21—21.
Figure 22:
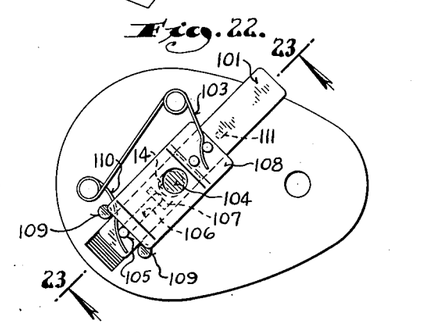
Figure 22 is a view similar to Figure 20 but showing the parts of the shutter mechanism in the positions they occupy just before the shutter trips.
Figure 23:
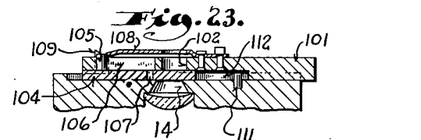
Figure 23 is a detail sectional view through Figure 22 on the plane of the line 23—23.
Figure 24:
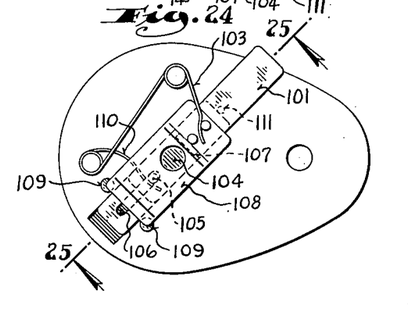
Figure 24 is a view similar to Figures 20 and 22 showing the shutter parts directly after being tripped and before the trigger has been restored to its normal projected position.
Figure 25:
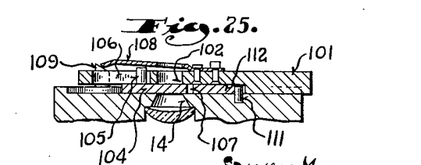
Figure 25 is a detail sectional view through Figure 24 on the plane of the line 25—25.

As the disc 88 approaches the completion of its spring propelled motion a buffer spring 97 protruding from the periphery of the disc strikes a pin 98 on the trigger bar as shown in Figure 18 to dampen out all possible oscillation of the disc and thus preclude accidental reopening of the shutter.

With the full depression of the trigger bar in the manner stated its return spring 94 is fully loaded tending to restore the parts to their normal positions but the mechanism is held against such restoration by the engagement of a spring latch finger 99 with an abutment on the trigger bar provided by a notch 100. The spring latch 99 overlies the pin 87 which, as noted hereinbefore, is pushed forward by the indexing of the film cartridge and such forward motion of the pin lifts the spring latch 99 to free the shutter mechanism for restoration to its normal position.

*The shutter mechanism of Figs. 19–25*

The latch mechanism shown in Figures 19 to 25, inclusive, is characterized by the fact that the two shutter elements are both reciprocable as distinguished from the previously described constructions wherein at least one of them was rotatable.

In this instance the trigger bar 101 constitutes the top shutter element. It is guided for reciprocation across the light entry aperture and has a hole 102 adapted to be brought into registry therewith by depression of the bar against the tension of a return spring 103.

Slidable beneath the bar 101 is a bottom shutter element 104. A pin 105 extending from the element 104 into an elongated slot 106 limits relative movement between the two shutter elements. The bottom shutter element 104 has a slit 107 therein which sweeps across the light entry aperture to take the picture.

A leaf spring 108 fixed to the trigger bar 101 is engageable with the pin 105 to hold the two shutter elements for movement in unison during depression of the bar. The parts are so held by the leaf spring engaging the pin 105 that the slit 107 leads the hole 102 and thus crosses the light entry aperture before the hole 102 is in registry therewith.

As the depression of the bar approaches the point at which its hole 102 is in complete registry with the light entry aperture the free end of the leaf spring 108 rides up onto two stationary cams 109 which lift the spring off the pin 105. Upon such disengagement of the spring from the pin 105 a spring 110 snaps the bottom shutter element 104 upwardly to carry its slit 107 across the light entry aperture, it being noted that the spring 110 moves in the plane of the bottom shutter element 104 and thus lies beneath the leaf spring 108.

The spring projected motion of the bottom shutter element 104 is limited by its engagement with a stop pin 111 fixed in the bottom of the guideway in which the trigger bar slides, the trigger bar being undercut as at 112 to accommodate the pin 111 and the element 104. The pin 111 also serves to limit the depression of the trigger bar at the point at which its hole 102 is in registry with the light entry aperture.

*The shutter mechanism of Figs. 26–31*

The shutter mechanism illustrated in Figures 26 to 31, inclusive, is somewhat comparable to that just described in that the two shutter elements are connected to move in unison during depression of the trigger bar.

In this case the trigger bar 113 is yieldingly projected to its normal position by a spring 114, at which its hole 115 is out of registry with the light entry aperture 14. Pivotally mounted on the lower or inner end of the trigger bar is a shutter plate 116 having a hole 117 adapted to sweep across the hole 115 and across the light entry aperture when the latter hole is in registry therewith.

Figure 26:
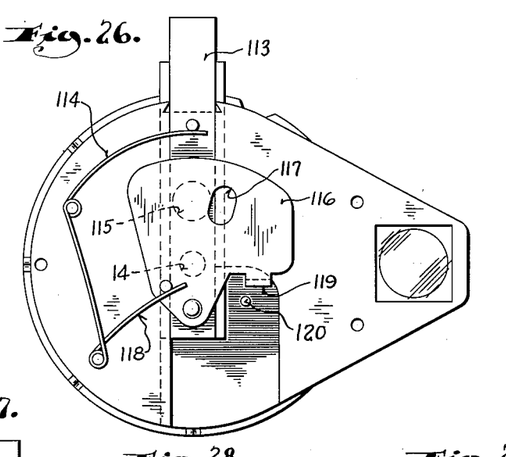
Figure 26 is a front view of a camera of slightly different cross sectional shape than that shown in the previously described figures, with the front cap or cover removed and illustrating still another form of shutter mechanism.
Figure 27:
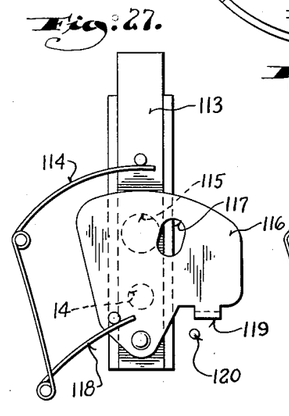
Figures 27 to 31, inclusive are front plan views of the shutter mechanism shown in Figure 26 in different positions to illustrate the operation thereof.
Figure 28:
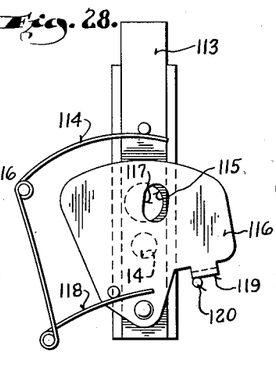

A spring 118 yieldingly holds the shutter plate 116 in its normal free position shown in Figure 26. Upon depression of the trigger bar a stop abutment 119 on the shutter plate collides with a fixed pin 120. Continued depression of the trigger bar thus causes the plate 116 to swing on its pivot against the tension of its spring 118. The parts are so proportioned that the hole 117 in the plate crosses the hole 115 in the trigger bar before the latter registers with the light entry aperture. Figure 28 shows the plate being so actuated.

Figure 29:
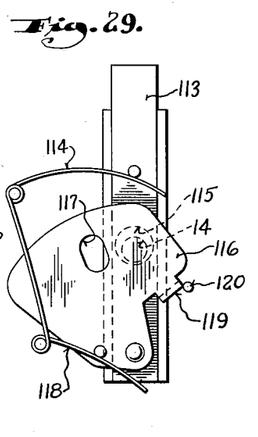
Figures 30, 31:
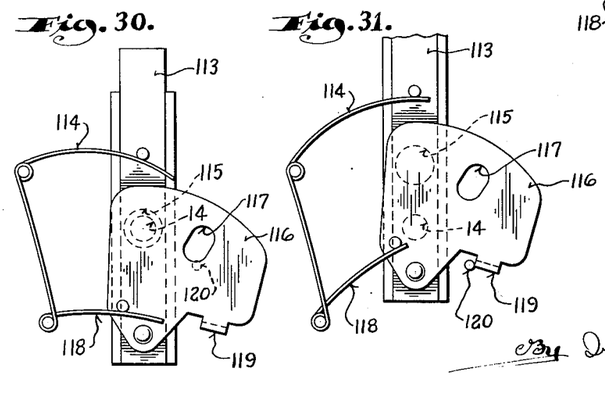
Figure 32:
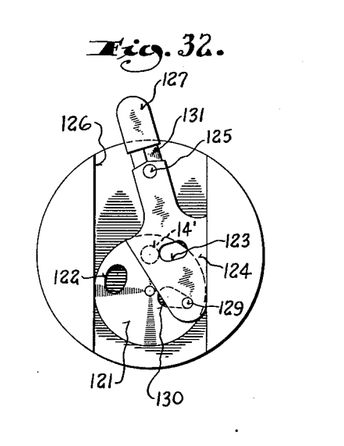
Figure 32 is a front view of a camera of still different configuration with the front cap or cover removed and showing another and greatly simplified form of shutter mechanism.
Figure 33:
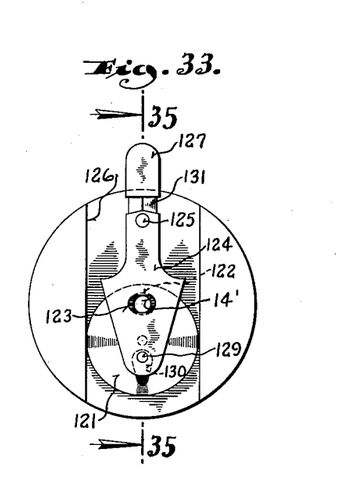
Figures 33 and 34 are views similar to Figure 32 showing the shutter mechanism in different positions.
Figure 34:
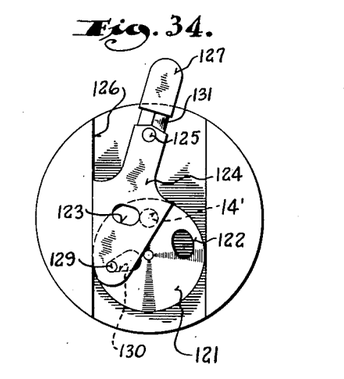
Figure 35:
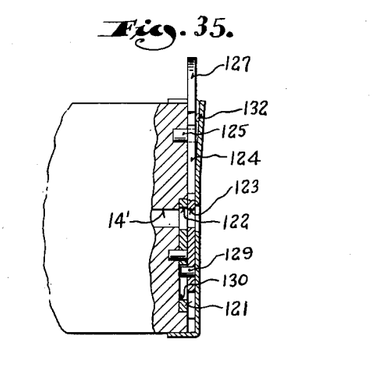
Figure 35 is a side view of the camera shown in Figure 32 with a part thereof broken away and shown in section on the plane of the line 35—35 in Figure 33.

When the depression of the trigger bar reaches the point illustrated in Figure 29 the hole 115 therein is almost completely in register with the light entry aperture. Only a slight further depression of the trigger bar is necessary to effect this result and during this slight additional travel the abutment 119 snaps past the fixed stop 120 whereupon the shutter plate is free to be swung on its pivot by its spring 118. Such spring propelled motion of the shutter plate sweeps its hole 117 across the light entry aperture to take the picture.

Upon the upstroke of the trigger bar the other side of the abutment 119 engages the pin 120 and thereby causes the plate 116 to rock slightly as the abutment 119 is carried past the pin 120.

*The shutter mechanism of Figs. 32–35*

In Figures 32 to 35, inclusive, an extremely simple shutter mechanism is illustrated. In this case the bottom shutter element is a disc 121 rotatably mounted in a shallow circular well in the front wall of the camera which in this case is cylindrical and has its light entry aperture 14' directly on the axis of the camera body.

A hole 122 in the disc 121 is positioned to sweep across the light entry aperture at the same time a hole 123 in the second shutter element 124 passes the aperture. The element 124 is in the nature of a lever pivotally mounted as at 125 in a transverse recess 126 in the front wall of the camera. A handle 127 extends from the lever-like element 124 to project beyond the periphery of the camera body.

An eccentric driving connection consisting of a pin 129 on the lower free end of the lever-like element 124 and engaging in an opening 130 in the disc provides means for rotating the disc 121 as the lever-like shutter element is swung from one position to the other, the two positions being defined by the engagement of the opposite edges of the lever-like element with the sides of the recess 126.

A cam 131 on the handle portion of the shutter element 124 is engaged by a spring pressed detent 132 positioned to hold the shutter elements in one position or the other.

During operation as the handle is moved the force of the spring detent causes an involuntary manual snapping of the handle from one side to the other and thus brings about a quick snap action as will be readily apparent.

From the foregoing description taken in connection with the accompanying drawings it will be readily apparent to those skilled in the art that the novel camera and film cartridge combination of this invention is especially adaptable to so-called miniature cameras and that the simplicity of its construction assures ecomonical manufacture without sacrificing quality and ability to take good pictures.

What I claim as my invention is:

1. In a camera: a housing having a light entry aperture opening to a substantially flat surface on the housing; a pivot pin secured to said housing alongside said aperture normal to said surface; cooperating inner and outer circular shutter discs mounted on said pin for rotary movement relative to the housing and to one another, portions of both discs extending across the light entry aperture and each disc having a hole therein registerable with the light entry aperture by rotation of the shutter discs on their pivot pin; a head on the outer end of said pin holding said discs closely adjacent to one another with the inner disc closely overlying said surface on the housing; cooperating means on the shutter discs for limiting relative rotation therebetween; means on the housing acting upon the inner shutter disc to yieldingly maintain the same in a position at which its hole is out of registry with the light entry aperture; a hub portion on one of said discs offset axially away from the other of said discs and providing a central annular space therebetween; a spiral spring confined in the space defined by said hub portion and having each end connected to one of said discs to yieldingly bias the outer disc to one of its limits of rotary movement relative to the inner disc; means on the housing connected with the inner disc and providing for limited manual rotation thereof against the bias of said spiral spring to a position of rotation at which its hole registers with the light entry aperture; releasable latch means on the housing engaged with the outer shutter disc to hold the same against rotation with the inner disc during such manually produced rotation of the latter; and latch release means on the inner disc engageable with said latch to release the same upon rotation of the inner disc to said position at which its hole registers with the light entry aperture so as to free the outer disc for rapid rotation by the spiral spring whereby the hole in the outer disc is quickly carried across the light entry aperture by said spiral spring.

2. The camera set forth in claim 1 wherein the central portion of the outer disc is offset axially outwardly away from the inner disc to provide a hub portion inside which the spiral spring is received; and further characterized by the fact that the inner end of the spiral spring is fixed to the inner shutter disc while the outer end of the spiral spring is hooked into a notch in the circumferential portion of the hub on the outer disc.

3. The camera set forth in claim 1 wherein said substantially flat surface on the housing is provided by the outer side of a mounting plate secured to the housing and having an opening registering with the light entry aperture in the housing, and having an aperture through which the pivot pin passes; and further characterized by the fact that said means for manually rotating the inner shutter disc comprises a pinion received in a pocket in the housing beneath the mounting plate and rotatably journalled on the pivot pin, said pinion having a hub projecting through the aperture in the mounting plate and fixed to said inner shutter disc, a rack bar meshing with said pinion and having one end accessible at the exterior of the housing for manual actuation, and means on the housing including said mounting plate constraining the rack bar to endwise reciprocatory motion relative to the housing.

FRED PERLIN.

REFERENCES CITED

The following references are of record in the file of this patent:

UNITED STATES PATENTS

| Number | Name | Date |
|---|---|---|
| 491,921 | Blair et al. | Feb. 14, 1893 |
| 517,539 | Casler | Apr. 3, 1894 |
| 534,337 | Mathein | Feb. 19, 1895 |
| 557,801 | Juan | Apr. 7, 1896 |
| 681,087 | Watkins | Aug. 20, 1901 |
| 1,773,106 | King | Aug. 19, 1930 |
| 1,838,798 | Voltz | Dec. 29, 1931 |
| 2,015,261 | Eckler | Sept. 24, 1935 |
| 2,119,712 | Koszalka | June 7, 1938 |
| 2,119,845 | Darling | June 7, 1938 |
| 2,161,338 | Crumrine | June 6, 1939 |
| 2,201,097 | Kingston | May 14, 1940 |
| 2,204,819 | O'Brien | June 18, 1940 |
| 2,206,811 | Drotning et al. | July 2, 1940 |
| 2,238,491 | Hutchison | Apr. 15, 1941 |
| 2,267,794 | Kosken | Dec. 30, 1941 |
| 2,271,562 | Lotz | Feb. 3, 1942 |
| 2,353,893 | Hineline | July 18, 1944 |
| 2,380,216 | Carter | July 10, 1945 |
| 2,418,644 | Hutchison et al. | Apr. 8, 1947 |
| 2,493,195 | Henne | Jan. 3, 1950 |

FOREIGN PATENTS

| Number | Country | Date |
|---|---|---|
| 19,480 | Great Britain | of 1890 |
| 603,166 | France | Jan. 7, 1926 |
| 507,594 | Germany | Sept. 18, 1930 |